US012734715B2

(12) United States Patent
Tanaami et al.

(10) Patent No.: US 12,734,715 B2
(45) Date of Patent: Sep. 15, 2026

(54) ROBOT HAND

(71) Applicant: SINTOKOGIO, LTD., Nagoya (JP)

(72) Inventors: Yoshikane Tanaami, Nagoya (JP); Miyuki Hayashi, Nagoya (JP); Takahiro Kokawaji, Nagoya (JP)

(73) Assignee: SINTOKOGIO, LTD., Aichi (JP)

( * ) Notice: Subject to any disclaimer, the term of this patent is extended or adjusted under 35 U.S.C. 154(b) by 806 days.

(21) Appl. No.: 18/296,611

(22) Filed: Apr. 6, 2023

(65) Prior Publication Data

US 2023/0347530 A1 Nov. 2, 2023

(30) Foreign Application Priority Data

Apr. 28, 2022 (JP) ................................ 2022-075259

(51) Int. Cl.

*B25J 15/10* (2006.01)
*B25J 15/12* (2006.01)
*B25J 19/02* (2006.01)

(52) U.S. Cl.

CPC ............ *B25J 15/103* (2013.01); *B25J 15/12* (2013.01); *B25J 19/028* (2013.01)

(58) Field of Classification Search

None

See application file for complete search history.

(56) References Cited

U.S. PATENT DOCUMENTS 3,888,362 A * 6/1975 Fletcher ................ B25J 19/028 901/17
12,162,139 B1 * 12/2024 Gonzalez Diaz ........ B25J 15/08
2017/0368694 A1 12/2017 Saito
2018/0009075 A1 * 1/2018 Maeda ............... B23Q 17/2476
2018/0333858 A1 * 11/2018 Asano .................... B25J 13/082
2019/0176348 A1 * 6/2019 Bingham ............ B25J 15/0004
2019/0309928 A1 * 10/2019 Vause .................. A61B 17/221
2020/0078959 A1 * 3/2020 Sakakibara ........... B25J 15/028
2020/0262089 A1 * 8/2020 Bingham ............ B25J 15/0213

(Continued)

FOREIGN PATENT DOCUMENTS

EP 4074477 A1 10/2022
JP 02-218576 8/1990
JP 05-192887 8/1993

(Continued)

OTHER PUBLICATIONS

Japanese Office Action and English translation thereof for Japanese Application No. 2022-075259 mailed Nov. 25, 2025.

(Continued)

*Primary Examiner* — Steven M Marsh
(74) *Attorney, Agent, or Firm* — Harness, Dickey & Pierce, P.L.C.

(57) ABSTRACT

Provided is a robot hand including: a plurality of claw members configured to grip a gripping target member; a support member that holds one end portions of the respective claw members such that the claw members are swingable; an actuator configured to drive the claw members; and a plurality of sensors attached to the respective claw members, each of the sensors being configured to sense an amount of deformation of a corresponding one of the claw members to which the sensors are attached, when the claw members grip the gripping target member.

4 Claims, 5 Drawing Sheets

(56) References Cited

U.S. PATENT DOCUMENTS

| | | | | |
|---|---|---|---|---|
| 2021/0323143 | A1* | 10/2021 | Zanella | B25J 9/1075 |
| 2022/0339803 | A1* | 10/2022 | Bingham | B25J 9/1697 |

FOREIGN PATENT DOCUMENTS

| | | |
|---|---|---|
| JP | 09-131173 | 5/1997 |
| JP | 2021-91041 A | 6/2021 |
| JP | 2021-175591 A | 11/2021 |

OTHER PUBLICATIONS

Office Action dated Mar. 31, 2026 issued in Japanese patent application No. 2022-075259.

* cited by examiner

ROBOT HAND

This Nonprovisional application claims priority under 35 U.S.C. § 119 on Patent Application No. 2022-075259 filed in Japan on Apr. 28, 2022, the entire contents of which are hereby incorporated by reference.

TECHNICAL FIELD

The present invention relates to robot hands.

BACKGROUND ART

Patent Literature 1 below discloses a robot hand having a configuration in which a direct-acting actuator accommodated in a housing opens and closes tip end portions of two claws. The direct-acting actuator drives two direct-acting shafts, and each shafts is led out through a leading-out opening formed in a side face of the housing. Each claw has a base portion secured to the corresponding direct-acting shaft outside the housing, and a sealing member is provided between the leading-out opening of the housing and the direct-acting shaft.

In addition, the positions at which the base portions of the claws are secured to the respective direct-acting shafts are located on the both sides across the tip end portions of the two claws. Further, at least one of the leading-out openings is located at a position lower than that of the tip end portions of the claws. Thus, since the positions at which the base portions of the claws are secured to the respective two direct-acting shafts are located on the both sides across the tip end portions of the two claws, this enables the tip end portions to easily grip a workpiece even when the dimensions of the workpiece are smaller than the side dimension of the housing.

CITATION LIST

Patent Literature

[Patent Literature 1]

Japanese Patent Application Publication, Tokukai, No. 2021-175591

SUMMARY OF INVENTION

Technical Problem

Such a robot hand is capable of gripping even a small workpiece with the tip end portions of the two claws; however, such a robot hand cannot measure the gripping force for gripping the workpiece. Thus, there is a possibility that the workpiece will be damaged depending on the gripping force. The gripping force may be measured by mounting a tactile sensor on the tip end portion of each claw; however, this makes the size of the claws depend on the size of the tactile sensors, so that this prevents flexible modification in size of the claws, such as, narrowing of the claws.

An aspect of the present invention has been made in view of such problems, and an object thereof is to provide a robot hand capable of measuring the gripping force applied by the plurality of claw members and capable of increasing flexibility in changing the size of the claw members.

Solution to Problem

To solve the above problems, a robot hand in accordance with an aspect of the present invention includes a plurality of claw members, a support member, an actuator, and a plurality of sensors. The plurality of claw members are configured to grip a gripping target member. The support member holds one end portions of the respective claw members such that the claw members are swingable. The actuator is configured to drive the claw members. The plurality of sensors are attached to the respective claw members, each of the sensors being configured to sense an amount of deformation of a corresponding one of the claw members to which the sensors are attached, when the claw members grip the gripping target member.

Advantageous Effects of Invention

According to an aspect of the present invention, it is possible to measure the gripping force applied by the plurality of claw members, and it is also possible to increase flexibility in changing the size of the claw members.

DESCRIPTION OF EMBODIMENTS

Figure 1:
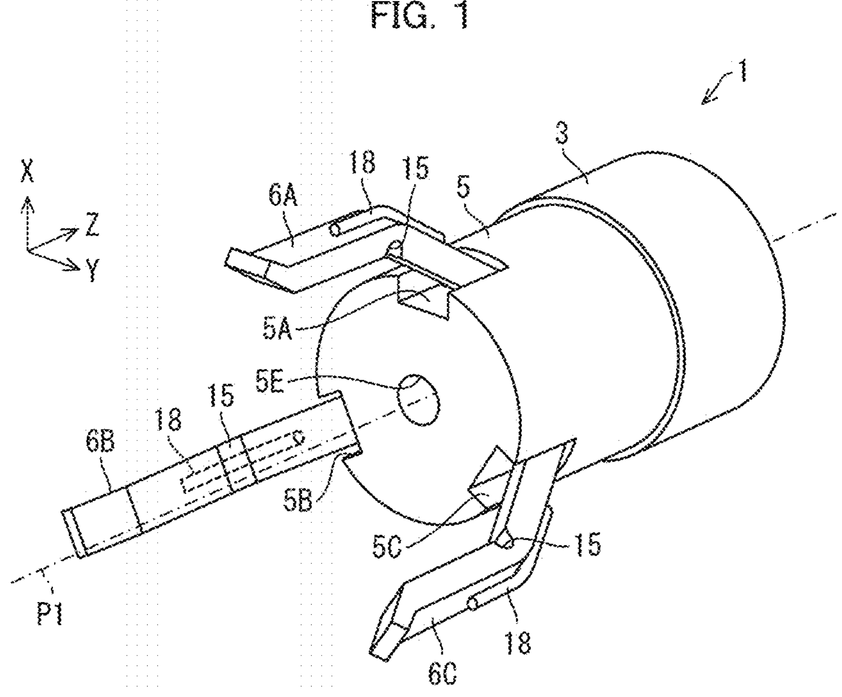
FIG. 1 is a perspective view illustrating an example of the configuration of a robot hand in accordance with Embodiment 1 of the present invention.

The following will describe Embodiments 1 to 3, to which the present invention practically applies, with reference to the drawings. The same or corresponding constituents, members, and processes to those illustrated in the drawings are assigned identical reference symbols, and duplicate descriptions thereof will be omitted as appropriate.

Embodiment 1

Figure 2:
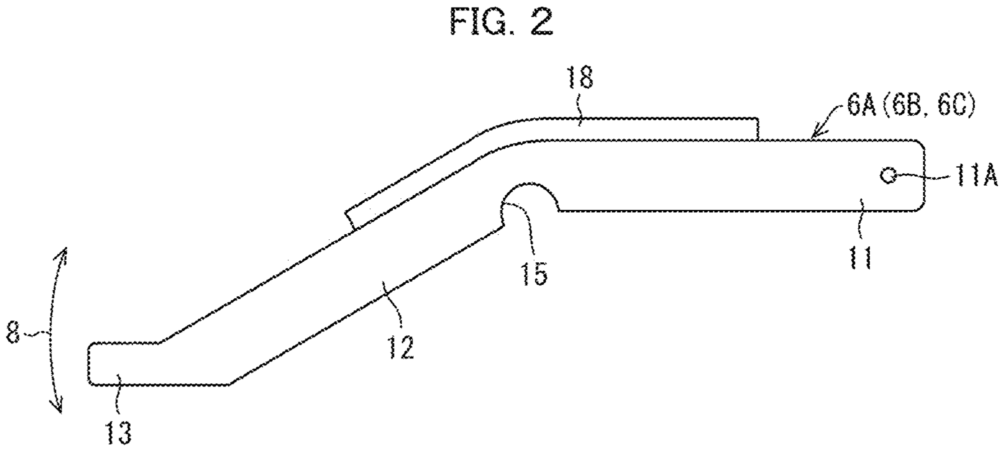
FIG. 2 is a side view illustrating an example of a claw member illustrated in FIG. 1.

A robot hand 1 in accordance with Embodiment 1 of the present invention will be described with reference to FIGS. 1 to 5. First, a schematic configuration of the robot hand 1 will be described with reference to FIGS. 1 and 2. FIG. 1 is a perspective view illustrating an example of the configuration of the robot hand 1 in accordance with Embodiment 1. FIG. 2 is a side view illustrating an example of a claw member 6A.

[Schematic Configuration]

FIG. 1 shows an X-axis direction, a Y-axis direction, and a Z-axis direction; these three directions are orthogonal to each other. Thus, the X-axis direction and the Y-axis direction are two directions that are orthogonal to each other and define a plane to which the Z-axis direction is normal. It is herein assumed that the Z-axis direction is a direction parallel to the central axis P1 of the robot hand 1, and a direction from the tip to the base end of the robot hand 1 is the positive direction of Z-axis.

As illustrated in FIG. 1, the robot hand 1 includes an actuator 3, a support member 5, and claw members 6A to 6C. The actuator 3 is a drive source for opening and closing the claw members 6A to 6C. The actuator 3 may be a stepping motor, but this is not limited thereto. For example, the actuator 3 may be constituted by a servomotor, a pneumatic cylinder, a hydraulic cylinder, or the like. FIG. 1 depicts the actuator 3 in a simplified fashion.

The support member 5 is attached to a tip end portion of the actuator 3. Further, the support member 5 has, in a tip end portion of an outer peripheral surface thereof, three groove portions 5A, 5B, and 5C, each having a rectangular cross-section and extending in the Z-axis direction. The groove portions 5A to 5C are equiangularly spaced apart, that is, at 120-degree intervals, around the central axis P1, which is parallel to the Z-axis, and the groove portions 5A to 5C are formed so as to be recessed radially inward. The groove portions 5A to 5C are formed so as to extend in the outer peripheral surface of the support member 5 from the tip end thereof to a substantially central portion thereof in the Z-axis direction.

The groove portions 5A to 5C have the same peripheral width and are formed such that each of the groove portions 5A to 5C has a width greater than that of the corresponding one of the claw members 6A to 6C. The support member 5 also has, at the central portion of the tip end face thereof, an opening 5E formed in a manner such that the central axis P1 passes through the opening 5E. In the opening 5E, a camera or the like may be mounted.

One end (a tip end portion on the positive side in the Z-axis direction, in FIG. 1) of each of the claw members 6A to 6C is supported in the rear of a corresponding one of the groove portions 5A to 5C of the support member 5 such that the claw members 6A to 6C are swingable. Thus, the claw members 6A to 6C are arranged so as to be equiangularly spaced apart, that is, at 120-degree intervals, around the central axis P1, which is parallel to the Z-axis. Although the claw members 6A to 6C are the same components, different reference symbols are assigned thereto for the purpose of illustration. The material of the claw members 6A to 6C may be appropriately chosen from, for example, metals such as aluminum and stainless steels, and synthetic resins.

As illustrated in FIGS. 1 and 2, each of the claw members 6A to 6C is formed so that it has a substantially rectangular right section and each side face thereof has a substantially arcuate elongated shape. Each of the claw members 6A to 6C is constituted by a base portion 11 supported in a swingable manner, an intermediate portion 12, and a tip end portion 13. The base portion 11 has a through hole 11A into which a support shaft (not illustrated) is fitted in an unslidable manner. Thus, each of the claw members 6A to 6C is driven to swing, by way of the actuator 3, around the support shaft (not illustrated) fitted into the through hole 11A.

As illustrated in FIG. 2, the intermediate portion 12 substantially horizontally extends from the base portion 11 to a substantially central portion in the longitudinal direction of each of the claw members 6A to 6C. The intermediate portion 12 then extends from the substantially central portion in the longitudinal direction of each of the claw members 6A to 6C to the tip end portion 13 so as to incline inward in a direction in which each of the claw members 6A to 6C swings (as indicated by arrow 8, in FIG. 2). Thus, the intermediate portion 12 bends at the substantially central portion in the longitudinal direction of each of the claw members 6A to 6C, so as to project outward in the direction in which the each of the claw members 6A to 6C swings, when viewed laterally. Then, from the tip of the intermediate portion 12, the tip end portion 13 extends substantially parallel to the base portion 11-side portion of the intermediate portion 12.

Further, in an inner face of the intermediate portion 12 that faces inward in the direction in which each of the claw members 6A to 6C swings, a groove 15 having a substantially semicircular cross-section is formed at the substantially central portion in the longitudinal direction of a corresponding one of the claw members 6A to 6C, in a manner such that the groove 15 extends, across the entire width, in a direction orthogonal to the longitudinal direction of the corresponding one of the claw members 6A to 6C. The maximum depth of the groove 15 may be set so as to be approximately half the thickness of the corresponding one of the claw members 6A to 6C. The cross-sectional shape of the groove 15 is not limited to the substantially semicircular shape. The cross-sectional shape of the groove 15 may be, for example, a substantially arc shape or a substantially rectangular shape. The groove 15 functions as a groove-like stress concentration point.

To each of the claw members 6A to 6C, attached is a sensor configured to sense an amount of deformation of a corresponding one of the claw members 6A to 6C to which the sensors are attached. According to Embodiment 1, as illustrated in FIGS. 1 and 2, a known piezoelectric linear sensor 18 (see Japanese Patent Application Publication, Tokukai, No. 2021-170032) with a predetermined length is secured by, for example, adhesion on an outer face of the intermediate portion 12 that faces outward in the direction in which each of the claw members 6A to 6C swings, at the substantially central portion in the longitudinal direction of a corresponding one of the claw members 6A to 6C, and is arranged to extend in the longitudinal direction of the corresponding one of the claw members 6A to 6C. The piezoelectric linear sensor 18 is merely an example of piezoelectric sensors, and the linear shape is not essential. The piezoelectric linear sensor 18 has a width narrower than that of the corresponding one of the claw members 6A to 6C in a direction orthogonal to the longitudinal direction of the corresponding one of the claw members 6A to 6C.

The piezoelectric linear sensor 18 is secured at a substantially central portion in the width direction of the corresponding one of the claw members 6A to 6C in such a manner as to extend orthogonally to the width direction of the corresponding one of the claw members 6A to 6C. Further, it is preferable that the piezoelectric linear sensor 18 be secured so that a substantially central portion thereof is located opposite the central portion of the groove 15 in the width direction, that is, the bottom of the groove 15.

For example, the piezoelectric linear sensor 18 is a linear sensor in which a piezoelectric material is disposed between an inner conductor and an outer conductor. With this configuration, when a force is applied to the piezoelectric linear sensor 18 from the exterior, a voltage is induced between the inner conductor and the outer conductor depending on the deformation of the piezoelectric material. Thus, by measuring the voltage induced between the inner conductor and the outer conductor of the piezoelectric linear sensor 18, it is possible to sense an amount of longitudinal deformation of a corresponding one of the claw members 6A to 6C.

Figure 3:
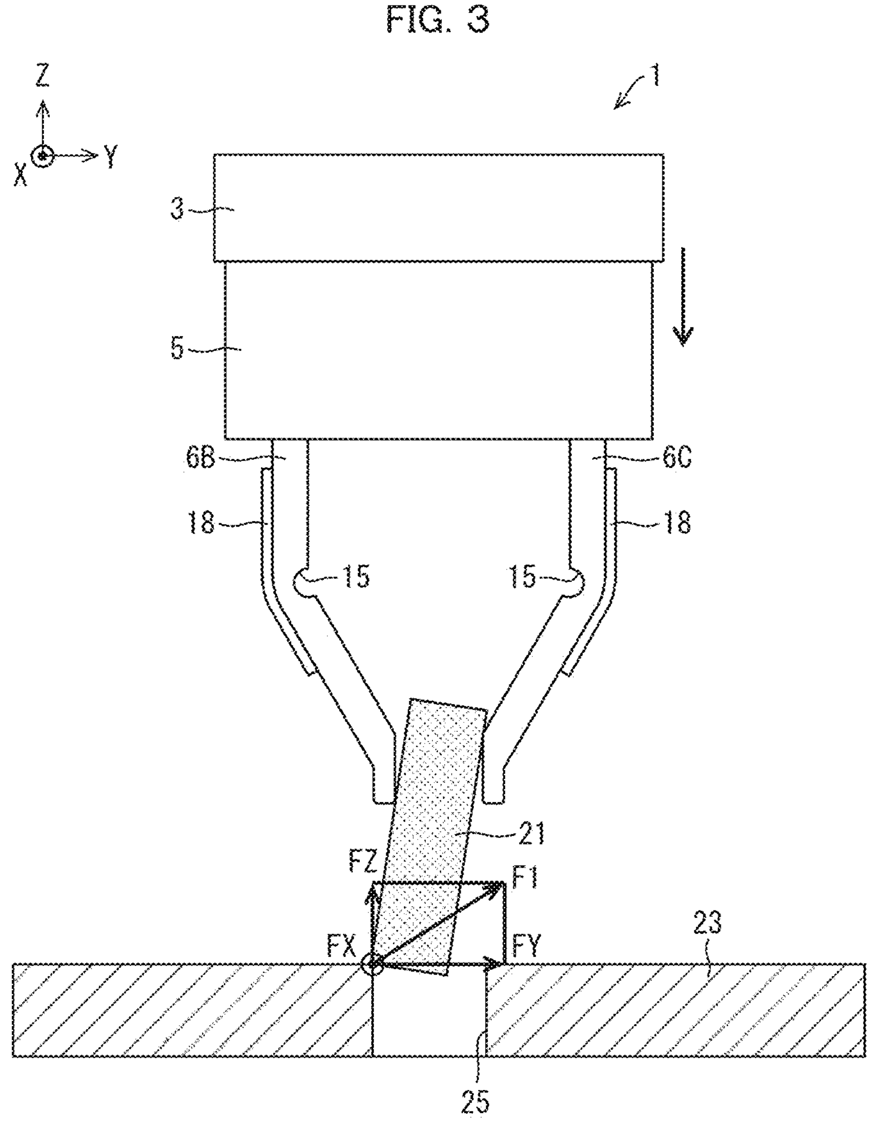
FIG. 3 is an explanatory view of a first step of a fitting operation in which the robot hand illustrated in FIG. 1 is used.

For example, as illustrated in FIG. 3, the robot hand 1 grips a round shank gripping target member 21 by means of the claw members 6A to 6C. In this case, it is possible to sense amounts of longitudinal deformation of the respective claw members 6A to 6C by measuring voltages induced between the inner conductors and the outer conductors of the piezoelectric linear sensors 18 attached to the respective claw members 6A to 6C.

Then, by calculating a pressing force applied by the tip end portions of the claw members 6A to 6C to hold the gripping target member 21 based on the amounts of longitudinal deformation of the respective claw members 6A to 6C, it is possible to measure a gripping force (holding force) applied by the three claw members 6A to 6C to hold the gripping target member 21. By doing this, it is possible to adjust the gripping force of the robot hand 1 to grip the gripping target member 21, so as to prevent damage to the gripping target member 21.

Further, as illustrated in FIG. 3, the robot hand 1 is driven to move in the negative direction of Z-axis (downward, in FIG. 3) while holding the round shank gripping target member 21 by means of the claw members 6A to 6C. Then, when the gripping target member 21 held by the claw members 6A to 6C comes into contact with a peripheral portion of a through hole 25 formed in an attachment target member 23, external force F1 acts on the robot hand 1 via the gripping target member 21. Here, the three claw members 6A to 6C are arranged at 120-degree intervals around the central axis P1.

Thus, by measuring voltages induced between the inner conductors and the outer conductors of the piezoelectric linear sensors 18 attached to the respective claw members 6A to 6C, it is possible to sense amounts of longitudinal deformation of the respective claw members 6A to 6C caused by the external force F1. Then, based on the amounts of longitudinal deformation of the respective claw members 6A to 6C, it is possible to calculate force components FX, FY, and FZ in three axial directions of the X-, Y-, and Z-axes, applied to the robot hand 1 via the gripping target member 21. Further, based on the amounts of longitudinal deformation of the respective claw members 6A to 6C, it is also possible to calculate moment components MX, MY, and MZ, each having a rotational axis of one of the three axes, that is, the X-, Y-, and Z-axes, applied to the robot hand 1 via the gripping target member 21.

[Fitting Operation]

Figure 4:
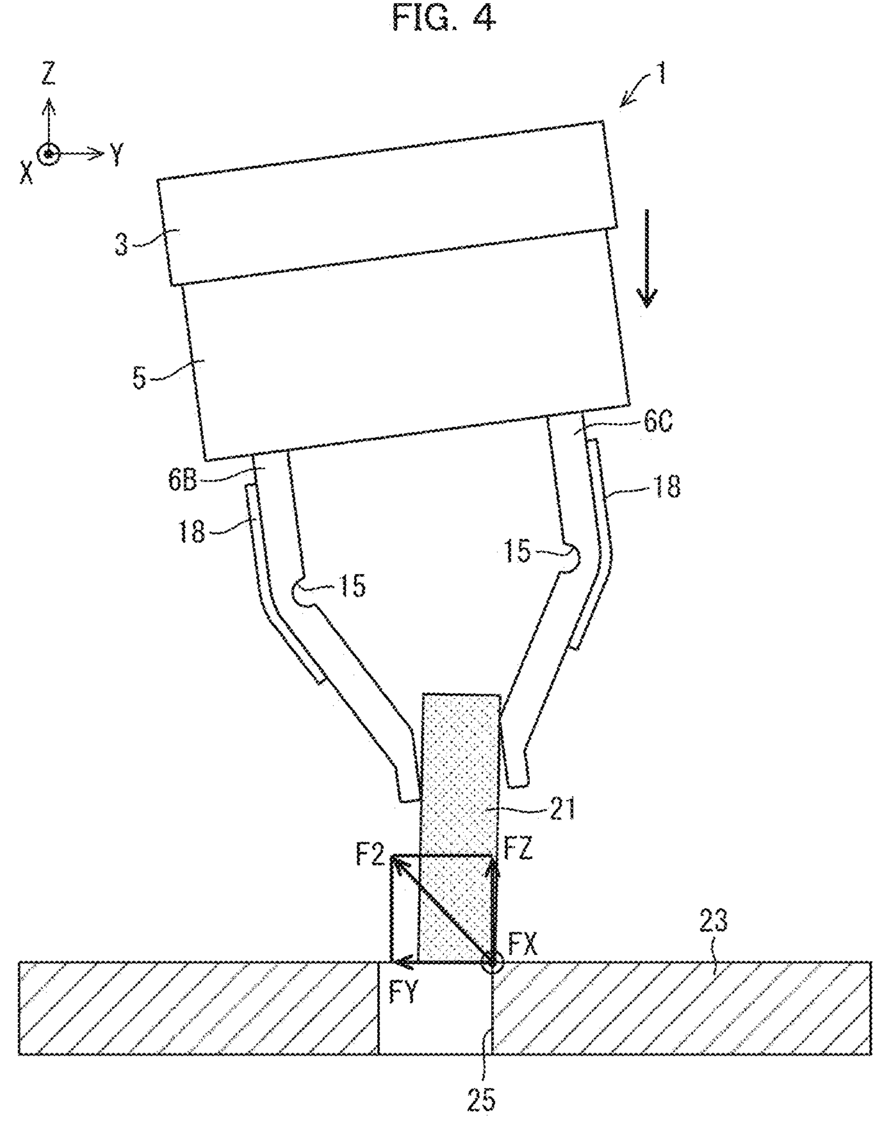
FIG. 4 is an explanatory view of a second step of the fitting operation in which the robot hand illustrated in FIG. 1 is used.
Figure 5:
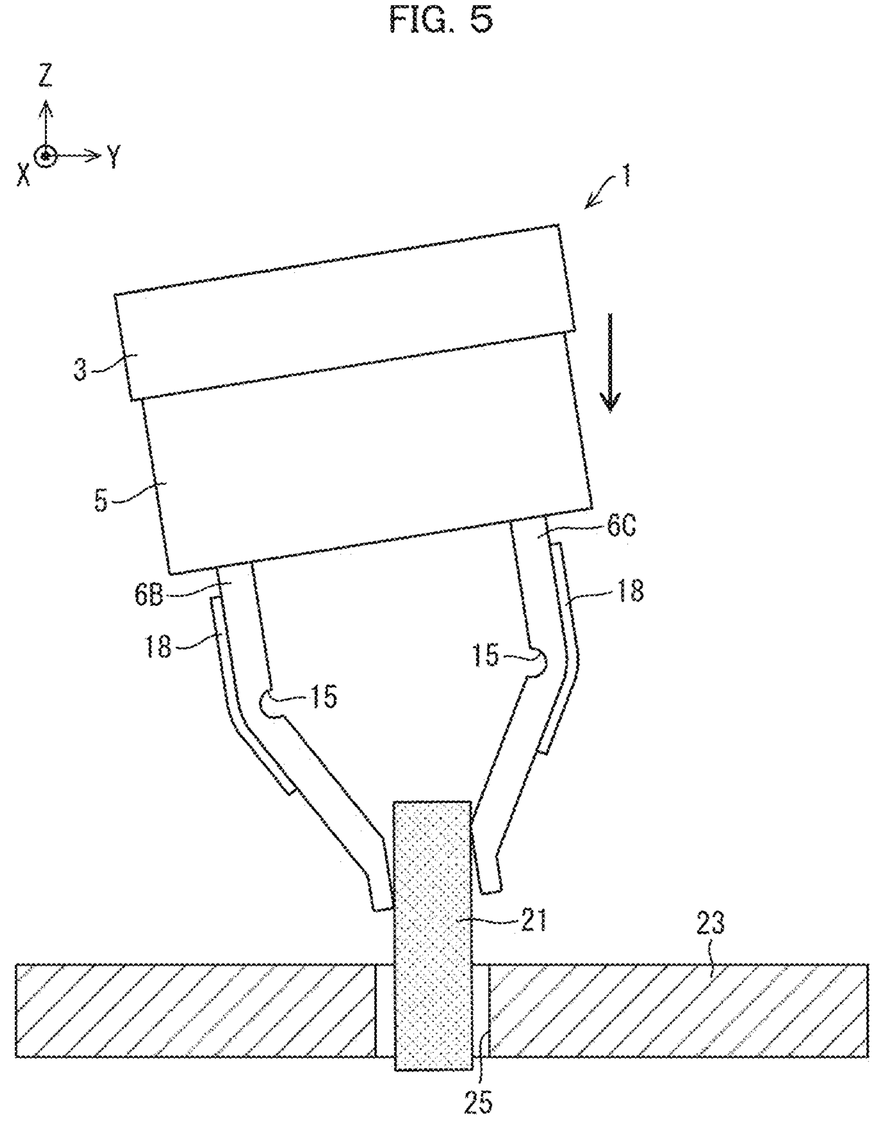
FIG. 5 is an explanatory view of a third step of the fitting operation in which the robot hand illustrated in FIG. 1 is used.

The following will describe, with reference to FIGS. 3 to 5, an example of the fitting operation carried out by a controller (not illustrated) for controlling the robot hand 1, configured as described above, and a robot arm. As the robot arm (not illustrated), a vertical articulated arm is used. The robot hand 1 is attached to the tip of the robot arm. FIG. 3 is an explanatory view of a first step of the fitting operation carried out by the controller. FIG. 4 is an explanatory view of a second step of the fitting operation carried out by the controller. FIG. 5 is an explanatory view of a third step of the fitting operation carried out by the controller. In FIGS. 3 to 5, the claw member 6A is omitted.

[First Step]

As illustrated in FIG. 3, the fitting operation carried out by the controller is fitting operation for fitting a round shank gripping target member 21 into a through hole 25 formed in a plate-like attachment target member 23. First, the controller makes the robot hand 1 take hold of one end of the round shank gripping target member 21 by means of the claw 6A to 6C. Then, the controller makes the gripping target member 21 move to a position on the positive side in the Z-axis direction with respect to the through hole 25 (i.e., above the through hole 25, in FIG. 3).

At this time, the positioning of the gripping target member 21 and the through hole 25 is performed by using an image recognition technique and by teaching of manipulations that is performed previously. It should be understood that there may be a case in which the positional and postural discrepancies occur between the gripping target member 21 and the through hole 25 due to variation in position at which the gripping target member 21 is supplied and an error in image recognition. This means that the gripping target member 21 and the through hole 25 are not always positioned right opposite to each other.

Next, the controller makes the robot arm (not illustrated) move to move the robot hand 1 in the negative direction of Z-axis (downward, in FIG. 3), so that the gripping target member 21 is lowered toward the through hole 25 with a substantially constant force. Then, when the gripping target member 21 comes into contact with an end edge of the through hole 25, external force F1 is generated between the gripping target member 21 and the attachment target member 23, so that the external force F1 acts on the claw members 6A to 6C via the gripping target member 21.

In response to this, the controller measures voltages induced in the piezoelectric linear sensors 18 attached to the respective claw members 6A to 6C, to sense amounts of longitudinal deformation of the respective claw members 6A to 6C caused by the external force F1. Based on the amounts of longitudinal deformation of the respective claw members 6A to 6C, the controller calculates force components FX, FY, and FZ in three axial directions of the X-, Y-, and Z-axes applied to the robot hand 1 via the gripping target member 21. Further, based on the amounts of longitudinal deformation of the respective claw members 6A to 6C, the controller calculates moment components MX, MY, and MZ, each having a rotational axis of one of three axes, that is, the X-, Y-, and Z-axes, applied to the robot hand 1 via the gripping target member 21.

Further, the controller makes the robot arm (not illustrated) stop moving when an amount of longitudinal deformation, caused by the external force F1, is sensed in any one of the claw members 6A to 6C. Then, the controller makes the robot arm (not illustrated) move to move the robot hand 1 in the positive direction of Z-axis (upward, in FIG. 3) by a predetermined distance, such as about 5 mm, so that the gripping target member 21 and the through hole 25 are spaced apart.

[Second Step]

Next, the controller makes the robot hand 1 move in the X-axis direction and Y-axis direction by a predetermined distance L1 (e.g., 0.2 mm) at a time so that each of the force components FX and FY in two axial directions of the X- and Y-axes acting on the robot hand 1 approaches zero. Further, the controller makes the robot hand 1 rotate by a predetermined angle θ1 (e.g., 0.3 degrees) at a time in directions rotating around the X-, Y-, and Z-axes so that each of the moment components MX, MY, and MZ, each having the rotational axis of one of three axes, that is, the X-, Y-, and Z-axes, and each acting on the robot hand 1, approaches zero.

Then, as illustrated in FIG. 4, the controller makes the robot arm (not illustrated) move to move the robot hand 1 in the negative direction of Z-axis (downward, in FIG. 4), so as to lower the gripping target member 21 toward the through hole 25 with a substantially constant force. Then, when the gripping target member 21 comes into contact with the end edge of the through hole 25, external force F2 is generated between the gripping target member 21 and the attachment target member 23, so that the external force F2 acts on the claw members 6A to 6C via the gripping target member 21.

In response to this, the controller measures voltages induced in the piezoelectric linear sensors 18 attached to the respective claw members 6A to 6C, to sense amounts of longitudinal deformation of the respective claw members 6A to 6C caused by the external force F2. Based on the amounts of longitudinal deformation of the respective claw members 6A to 6C, the controller calculates force components FX, FY, and FZ in three axial directions of the X-, Y-, and Z-axes applied to the robot hand 1 via the gripping target member 21. Further, based on the amounts of longitudinal deformation of the respective claw members 6A to 6C, the controller calculates moment components MX, MY, and MZ, each having a rotational axis of one of three axes, that is, the X-, Y-, and Z-axes, applied to the robot hand 1 via the gripping target member 21.

Further, the controller makes the robot arm (not illustrated) stop moving when an amount of longitudinal deformation, caused by the external force F2, is sensed in any one of the claw members 6A to 6C. Then, the controller makes the robot arm (not illustrated) move to move the robot hand 1 in the positive direction of Z-axis (upward, in FIG. 4) by a predetermined distance, such as about 5 mm, so that the gripping target member 21 and the through hole 25 are spaced apart.

[Third Step]

Next, the controller makes the robot hand 1 move in the X-axis direction and Y-axis direction by a half of the predetermined distance L1 (e.g., 0.1 mm) at a time so that each of the force components FX and FY in two axial directions of the X- and Y-axes acting on the robot hand 1 approaches zero. Further, the controller makes the robot hand 1 rotate by a half of the predetermined angle θ1 (e.g., 0.15 degrees) at a time in directions rotating around the X-, Y-, and Z-axes so that each of the moment components MX, MY, and MZ, each having the rotational axis of one of the three axes, that is, the X-, Y-, and Z-axes, and each acting on the robot hand 1, approaches zero.

Then, as illustrated in FIG. 5, the controller makes the robot arm (not illustrated) move to move the robot hand 1 in the negative direction of Z-axis (downward, in FIG. 5), so as to lower the gripping target member 21 toward the through hole 25 with a substantially constant force. In addition, the controller measures voltages induced in the piezoelectric linear sensors 18 attached to the respective claw members 6A to 6C.

When the gripping target member 21 enters the through hole 25 without coming into contact with the end edge of the through hole 25, the controller pushes the round shank gripping target member 21 inward the through hole 25. That is, when the voltages induced in the piezoelectric linear sensors 18 attached to the respective claw members 6A to 6C do not increase, the controller pushes the round shank gripping target member 21 inward the through hole 25, and terminates the fitting operation.

As described in detail in the foregoing, the robot hand 1 in accordance with Embodiment 1 is provided with the piezoelectric linear sensors 18 each being secured by, for example, adhesion to an outer face of a corresponding one of the claw members 6A to 6C that faces outward in the direction in which each of the claw members swings, and each of the piezoelectric linear sensors 18 extends in the longitudinal direction of a corresponding one of the claw members 6A to 6C. Thus, by measuring the voltages induced in the piezoelectric linear sensors 18 attached to the respective claw members 6A to 6C, it is possible to sense amounts of longitudinal deformation of the respective claw members 6A to 6C caused by external force F.

Thus, by calculating a pressing force applied by the tip end portions of the claw members 6A to 6C to hold the gripping target member 21 based on the amounts of longitudinal deformation of the respective claw members 6A to 6C, it is possible to measure a gripping force (holding force) applied by the three claw members 6A to 6C to hold the gripping target member 21. By doing this, it is possible to adjust the gripping force of the robot hand 1 to grip the gripping target member 21, so as to prevent damage to the gripping target member 21.

Further, based on the amounts of longitudinal deformation of the respective claw members 6A to 6C, it is possible to calculate force components FX, FY, and FZ in three axial directions of the X-, Y-, and Z-axes, applied to the robot hand 1 via the gripping target member 21. Further, based on the amounts of longitudinal deformation of the respective claw members 6A to 6C, it is also possible to calculate moment components MX, MY, and MZ, each having a rotational axis of one of the three axes, that is, the X-, Y-, and Z-axes, applied to the robot hand 1 via the gripping target member 21. This enables the use of the robot hand 1 in the fitting operation such as an operation for fitting the round shank gripping target member 21 into the through hole 25.

Further, in an inner face of each of the claw members 6A to 6C that faces inward in the direction in which each of the claw members 6A to 6C swings, a groove 15 having a substantially semicircular cross-section is formed at a position opposite the substantial central portion of the piezoelectric linear sensor 18 in a manner such that the groove 15 extends, across the entire width, in a direction orthogonal to the longitudinal direction of each of the claw members 6A to 6C. This configuration enables the groove 15 to increase an amount of longitudinal deformation at a position at which the piezoelectric linear sensor 18 of the corresponding one of the claw members 6A to 6C is mounted, when the claw members 6A to 6C grip the gripping target member 21. Thus, it is possible to increase a sensor output of the piezoelectric linear sensors 18, and to improve the accuracy of sensing the amounts of deformation of the claw members 6A to 6C.

Further, each piezoelectric linear sensor 18 is mounted on the outer face of the corresponding one of the claw members 6A to 6C that faces outward in the direction in which each of the claw members 6A to 6C swings. This enables an operator to rapidly perform, for example, replacement of the piezoelectric linear sensor 18 without disassembling the robot hand 1. However, the piezoelectric linear sensors 18 may be mounted on the respective claw members 6A to 6C on the inner faces thereof each facing inward in the direction in which each of the claw members 6A to 6C swings, and the grooves 15 may be formed in the outer faces of the respective claw members 6A to 6C each facing outward in the direction in which each of the claw members 6A to 6C swings.

In addition, since a piezoelectric linear sensor with a smaller diameter may be used as the piezoelectric linear sensor 18, this increases flexibility in changing the size of the claw members 6A to 6C; specifically, the width of the claw members 6A to 6C may be reduced. Thus, even in a case in which claw members 6A to 6C have the narrower width, the piezoelectric linear sensors 18 can sense the amounts of deformation of the respective claw members 6A to 6C when the gripping target member 21 is gripped.

Embodiment 2

Figure 6:
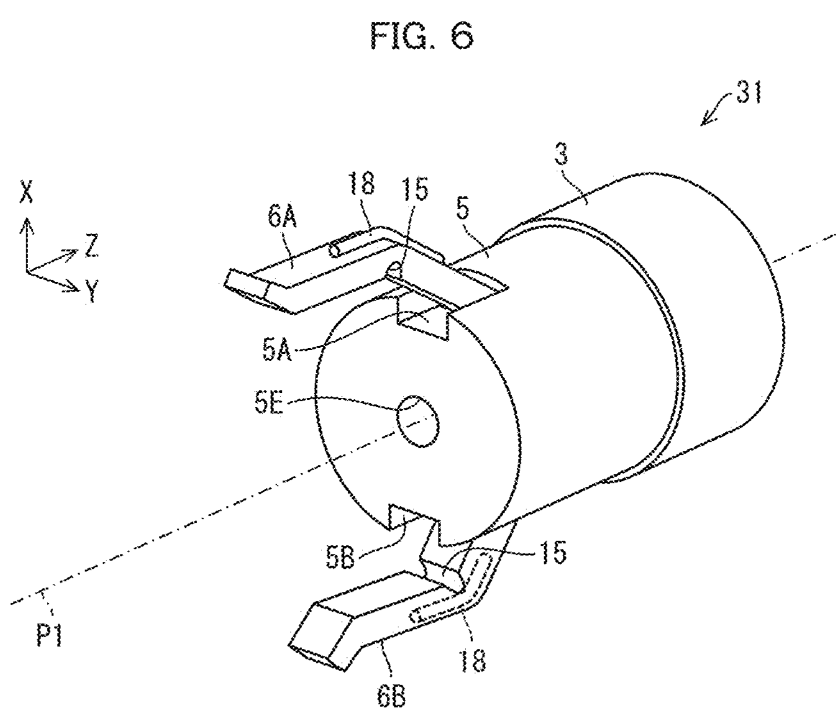
FIG. 6 is a perspective view illustrating an example of the configuration of a robot hand in accordance with Embodiment 2 of the present invention.

The following will describe, with reference to FIG. 6, a schematic configuration of a robot hand 31 in accordance with Embodiment 2 of the present invention. FIG. 6 is a perspective view illustrating an example of the configuration of the robot hand 31 in accordance with Embodiment 2.

As illustrated in FIG. 6, the robot hand 31 has a configuration substantially identical to that of the robot hand 1 in accordance with Embodiment 1. However, it is different in that no groove portion 5C is formed in the outer peripheral surface of the support member 5. In addition, the support member 5 has, in a tip end portion of the outer peripheral surface thereof, two groove portions 5A and 5B each having a rectangular cross-section. The two groove portions 5A and 5B are arranged symmetrically across the central axis P1 parallel to the Z-axis, that is, at 180-degree intervals, and are formed so as to be recessed radially inward. The support member 5 also has, at the central portion of the tip end face thereof, an opening 5E formed in a manner such that the central axis P1 passes through the opening 5E. In the opening 5E, a camera or the like may be mounted.

One end (a tip end portion on the positive side in the Z-axis direction, in FIG. 6) of each of the claw members 6A and 6B is supported in the rear of a corresponding one of the groove portions 5A and 5B of the support member 5 such that the claw members 6A and 6B are swingable. This makes the claw members 6A and 6B arranged symmetrically across the central axis P1 parallel to the Z-axis so that the claw members 6A and 6B are arranged to face each other in the X-axis direction at 180-degree intervals. Thus, the two claw members 6A and 6B are driven to swing in the X-axis direction, by way of the actuator 3, so as to be open and closed. The claw members 6A and 6B are the same components. The material of the claw members 6A and 6B may be appropriately chosen from, for example, metals, such as aluminum and stainless steels, and synthetic resins. Further, each of the claw members 6A and 6B has, at a substantially central portion in the longitudinal direction thereof, a piezoelectric linear sensor 18 secured by, for example, adhesion on an outer face of each of the claw members 6A and 6B that faces outward in the direction in which each of the claw members 6A and 6B swings so that the piezoelectric linear sensor 18 extends in the longitudinal direction of the corresponding one of the claw members 6A and 6B.

The robot hand 31 configured as in the foregoing grips a round shank gripping target member 21 (see FIG. 3) by means of two claw members 6A and 6B by way of the actuator 3. In this case, it is possible to sense amounts of longitudinal deformation of the respective claw members 6A and 6B by measuring voltages induced between the inner conductors and the outer conductors of the piezoelectric linear sensors 18 attached to the respective claw members 6A and 6B.

Then, by calculating a pressing force applied by the tip end portions of the claw members 6A and 6B to hold the gripping target member 21 based on the amounts of longitudinal deformation of the respective claw members 6A and 6B, it is possible to measure a gripping force (holding force) applied by the two claw members 6A and 6B to hold the gripping target member 21. By doing this, it is possible to adjust the gripping force of the robot hand 31 to grip the gripping target member 21, so as to prevent damage to the gripping target member 21.

Further, similarly to the robot hand 1 in accordance with Embodiment 1 described above illustrated in FIG. 3, the robot hand 31 may be driven to move in the negative direction of Z-axis (downward, in FIG. 3) while holding the round shank gripping target member 21 by means of the two claw members 6A and 6B. Then, when the gripping target member 21 held by the claw members 6A and 6B comes into contact with a peripheral portion of a through hole 25 formed in an attachment target member 23, external force F1 acts on the robot hand 31 via the gripping target member 21. Here, the two claw members 6A and 6B are arranged at 180-degree intervals around the central axis P1 in such a manner as to face each other.

Thus, by measuring voltages induced between the inner conductors and the outer conductors of the piezoelectric linear sensors 18 attached to the respective claw members 6A and 6B, it is possible to sense amounts of longitudinal deformation of the respective claw members 6A and 6B caused by the external force F1. Then, based on the amounts of longitudinal deformation of the respective claw members 6A and 6B, it is possible to calculate force components FX, FY, and FZ in three axial directions of the X-, Y-, and Z-axes, applied to the robot hand 31 via the gripping target member 21. Further, based on the amounts of longitudinal deformation of the respective claw members 6A and 6B, it is also possible to calculate moment components MX, MY, and MZ, each having a rotational axis of one of the three axes, that is, the X-, Y-, and Z-axes, applied to the robot hand 31 via the gripping target member 21.

As described in detail in the foregoing, the robot hand 31 in accordance with Embodiment 2 is provided with the piezoelectric linear sensors 18 each being secured by, for example, adhesion to an outer face of a corresponding one of the claw members 6A and 6B that faces outward in the direction in which each of the claw members 6A and 6B swings, and each of the piezoelectric linear sensors 18 extends in the longitudinal direction of a corresponding one of the claw members 6A and 6B. Thus, by measuring the voltages induced in the piezoelectric linear sensors 18 attached to the respective claw members 6A and 6B, it is possible to sense amounts of longitudinal deformation of the respective claw members 6A and 6B caused by external force F.

Thus, by calculating a pressing force applied by the tip end portions of the claw members 6A and 6B to hold the gripping target member 21 based on the amounts of longitudinal deformation of the respective claw members 6A and 6B, it is possible to measure a gripping force (holding force) applied by the two claw members 6A and 6B to hold the gripping target member 21. By doing this, it is possible to adjust the gripping force of the robot hand 31 to grip the gripping target member 21, so as to prevent damage to the gripping target member 21.

Further, based on the amounts of longitudinal deformation of the respective claw members 6A and 6B, it is possible to calculate force components FX, FY, and FZ in three axial directions of the X-, Y-, and Z-axes, applied to the robot hand 31 via the gripping target member 21. Further, based on the amounts of longitudinal deformation of the respective claw members 6A and 6B, it is also possible to calculate moment components MX, MY, and MZ, each having a rotational axis of one of the three axes, that is, the X-, Y-, and Z-axes, applied to the robot hand 31 via the gripping target member 21. This enables the use of the robot hand 31 in the fitting operation such as an operation for fitting the round shank gripping target member 21 into the through hole 25 (see FIG. 3), sensing contact or the like of the gripping target member 21 with the through hole 25.

Embodiment 3

Figure 7:
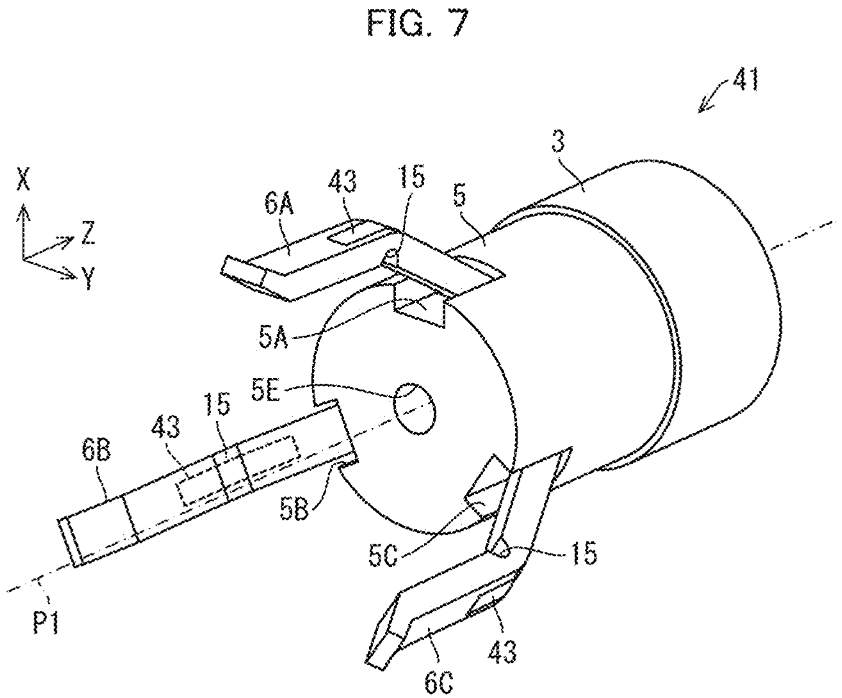
FIG. 7 is a perspective view illustrating an example of the configuration of a robot hand in accordance with Embodiment 3 of the present invention.

The following will describe, with reference to FIG. 7, a schematic configuration of a robot hand 41 in accordance with Embodiment 3 of the present invention. FIG. 7 is a perspective view illustrating an example of the configuration of the robot hand 41 in accordance with Embodiment 3.

As illustrated in FIG. 7, the robot hand 41 has a configuration substantially identical to that of the robot hand 1 in accordance with Embodiment 1. However, it is different in that each of the claw members 6A to 6C is provided with a known strain sensing device 43 instead of the piezoelectric linear sensors 18. The strain sensing device 43 has a substantially elongated quadrilateral shape and is secured by, for example, adhesion. The strain sensing device 43 includes strain gauges such as a metal thin film strain gauge and a semiconductor strain gauge. In Embodiment 3, the strain sensing device 43 is, for example, a metal thin film strain gauge.

The strain gauge is a device that causes a change in resistance in response to longitudinal deformation of a corresponding one of the claw members 6A to 6C. Any known strain gauges may be used as the strain gauge. Examples of the known strain gauges may include: a metal thin film strain gauge including a circuit pattern of a metal thin film, and a flexible resin film covering the circuit pattern; and a semiconductor strain gauge constituted by a semiconductor thin film. Examples of the metal of the metal thin film may include Cu (copper)-Ni (nickel) alloys, and Ni—Cr (chromium) alloys. Examples of the resin may include polyimide resins and epoxy resins.

An adhesive may be used to secure the strain gauge to each of the claw members 6A to 6C on an outer face thereof that faces outward in the direction in which each of the claw members 6A to 6C swings. Alternatively, to provide the strain gauge, a sputtering technique or a vacuum deposition technique may be used to directly form wiring made of a metal thin film or a semiconductor thin film on the outer face of each of the claw members 6A to 6C that faces outward in the direction in which each of the claw members 6A to 6C swings.

Further, as illustrated in FIG. 7, the strain sensing device 43 having a substantially elongated quadrilateral shape is secured by, for example, adhesion, to each of the claw members 6A to 6C at a substantially central portion in the width direction of each of the claw members 6A to 6C in a manner such that the strain sensing device 43 extends orthogonally to the width direction of each of the claw members 6A to 6C. Further, it is preferable that the strain sensing device 43 be secured so that a substantially central portion thereof is located opposite the central portion of the groove 15 in the width direction, that is, the bottom of the groove 15.

The robot hand 41 configured as in the foregoing grips a round shank gripping target member 21 (see FIG. 3) by means of claw members 6A to 6C by way of, for example, the actuator 3. In this case, it is possible to sense amounts of longitudinal deformation of the respective claw members 6A to 6C by sensing changes in resistance of strain sensing devices 43 attached to the respective claw members 6A to 6C.

Then, by calculating a pressing force applied by the tip end portions of the claw members 6A to 6C to hold the gripping target member 21 based on the amounts of longitudinal deformation of the respective claw members 6A to 6C, it is possible to measure a gripping force (holding force) applied by the three claw members 6A to 6C to hold the gripping target member 21. By doing this, it is possible to adjust the gripping force of the robot hand 41 to grip the gripping target member 21, so as to prevent damage to the gripping target member 21.

Further, similarly to the robot hand 1 in accordance with Embodiment 1 described above, the robot hand 41 is attached to the tip of the robot arm (not illustrated). As illustrated in FIG. 3, the robot hand 41 may be driven to move in the negative direction of Z-axis (downward, in FIG. 3) while holding the round shank gripping target member 21 by means of the claw members 6A to 6C of the robot hand 41. Then, when the gripping target member 21 held by the claw members 6A to 6C comes into contact with a peripheral portion of a through hole 25 formed in an attachment target member 23, external force F1 acts on the robot hand 41 via the gripping target member 21. Here, the three claw members 6A to 6C are arranged at 120-degree intervals around the central axis P1.

Thus, by measuring resistance values of the strain sensing devices 43 attached to the respective claw members 6A to 6C, it is possible to sense amounts of longitudinal deformation of the respective claw members 6A to 6C caused by the external force F1. Then, based on the amounts of longitudinal deformation of the respective claw members 6A to 6C, it is possible to calculate force components FX, FY, and FZ in three axial directions of the X-, Y-, and Z-axes, applied to the robot hand 41 via the gripping target member 21. Further, based on the amounts of longitudinal deformation of the respective claw members 6A to 6C, it is also possible to calculate moment components MX, MY, and MZ, each having a rotational axis of one of the three axes, that is, the X-, Y-, and Z-axes, applied to the robot hand 41 via the gripping target member 21. This enables the use of the robot hand 41 in the fitting operation such as an operation for fitting the round shank gripping target member 21 into the through hole 25 (see FIG. 3), similarly to the robot hand 1 in accordance with Embodiment 1 described above.

Further, in an inner face of each of the claw members 6A to 6C that faces inward in the direction in which each of the claw members 6A to 6C swings, a groove 15 having a substantially semicircular cross-section is formed at a position opposite a substantially central portion of the strain sensing device 43 in a manner such that the groove 15 extends, across the entire width, in a direction orthogonal to the longitudinal direction of each of the claw members 6A to 6C. This configuration enables the groove 15 to increase an amount of longitudinal deformation at a position at which the strain sensing device 43 of each of the claw members 6A to 6C is mounted, when the claw members 6A to 6C grip the gripping target member 21. Thus, it is possible to increase a sensor output of the strain sensing device 43, and to improve the accuracy of sensing the amounts of deformation of the claw members 6A to 6C.

Further, each strain sensing device 43 is mounted on the outer face of the corresponding one of the claw members 6A to 6C that faces outward in the direction in which each of the claw members 6A to 6C swings. This enables an operator to rapidly perform, for example, replacement of the strain sensing device 43 without disassembling the robot hand 1. However, the strain sensing device 43 may be mounted on the respective claw members 6A to 6C on the inner faces thereof each facing inward in the direction in which each of the claw members 6A to 6C swings, and the grooves 15 may be formed in the outer faces of the respective claw members 6A to 6C each facing outward in the direction in which each of the claw members 6A to 6C swings.

[Variation 1]

The robot hand 31 in accordance with Embodiment 2 described above may be provided with a strain sensing device 43 (see FIG. 7) secured thereto by, for example, adhesion, instead of the piezoelectric linear sensors 18 of the respective claw members 6A and 6B (see FIG. 6). The robot hand 31 thus configured grips a round shank gripping target member 21 (see FIG. 3) by means of claw members 6A and 6B by way of, for example, the actuator 3. In this case, it is possible to sense amounts of longitudinal deformation of the respective claw members 6A and 6B by sensing changes in resistance of strain sensing devices 43 attached to the respective claw members 6A and 6B.

Then, by calculating a pressing force applied by the tip end portions of the claw members 6A and 6B to hold the gripping target member 21 based on the amounts of longitudinal deformation of the respective claw members 6A and 6B, it is possible to measure a gripping force (holding force) applied by the two claw members 6A and 6B to hold the gripping target member 21. By doing this, it is possible to adjust the gripping force of the robot hand 31 to grip the gripping target member 21, so as to prevent damage to the gripping target member 21.

Further, similarly to the robot hand 1 in accordance with Embodiment 1 described above illustrated in FIG. 3, the robot hand 31 may be driven to move in the negative direction of Z-axis (downward, in FIG. 3) while holding the round shank gripping target member 21 by means of the two claw members 6A and 6B. Then, when the gripping target member 21 held by the claw members 6A and 6B comes into contact with a peripheral portion of a through hole 25 formed in an attachment target member 23, external force F1 acts on the robot hand 31 via the gripping target member 21. Here, the two claw members 6A and 6B are arranged at 180-degree intervals around the central axis P1 in such a manner as to face each other.

Thus, by measuring resistance values of the strain sensing devices 43 attached to the respective claw members 6A and 6B, it is possible to sense amounts of longitudinal deformation of the respective claw members 6A and 6B caused by the external force F1. Then, based on the amounts of longitudinal deformation of the respective claw members 6A and 6B, it is possible to calculate force components FX, FY, and FZ in three axial directions of the X-, Y-, and Z-axes, applied to the robot hand 31 via the gripping target member 21. Further, based on the amounts of longitudinal deformation of the respective claw members 6A and 6B, it is also possible to calculate moment components MX, MY, and MZ, each having a rotational axis of one of the three axes, that is, the X-, Y-, and Z-axes, applied to the robot hand 31 via the gripping target member 21. This enables the use of the robot hand 31 in the fitting operation such as an operation for fitting the round shank gripping target member 21 into the through hole 25 (see FIG. 3), similarly to the robot hand 1 in accordance with Embodiment 1 described above.

[Variation 2]

Instead of the piezoelectric linear sensors 18, the robot hand 1 in accordance with Embodiment 1 and the robot hand 31 in accordance with Embodiment 2, which are described above, may be provided with film-like piezoelectric sensors each having a width narrower than the width, which is orthogonal to the longitudinal direction, of a corresponding one of the claw members 6A to 6C. This film-like piezoelectric sensor is secured by, for example, adhesion, at a substantially central portion in the width direction of each of the claw members 6A to 6C in such a manner as to extend orthogonally to the width direction of each of the claw members 6A to 6C and extend in the longitudinal direction of each of the claw members 6A to 6C. Further, it is preferable that the film-like piezoelectric sensor be secured so that a substantially central portion thereof is located opposite the central portion of the groove 15 in the width direction, that is, the bottom of the groove 15. With this configuration, it is possible to achieve advantageous effects similar to those achieved by the robot hand 1 in accordance with Embodiment 1 and the robot hand 31 in accordance with Embodiment 2.

[Variation 3]

The robot hand 1 in accordance with Embodiment 1 and the robot hand 31 in accordance with Embodiment 2, which are described above, may use sensors manufactured by the MEMS technology, instead of the piezoelectric linear sensors 18. Thus, it is possible to provide a more compact robot hand.

[Additional Remarks]

The present invention is not limited to the above embodiments, but can be altered by a person skilled in the art within the scope of the claims. The present invention also encompasses, in its technical scope, any embodiment derived by combining technical means disclosed in differing embodiments.

REFERENCE SIGNS LIST

1, 31, 41 Robot hands
3 Actuator
5 Support member
6A, 6B, 6C Claw members
15 groove
18 Piezoelectric linear sensor
43 Strain sensing device

The invention claimed is:

1. A robot hand comprising:

a plurality of claw members configured to grip a gripping target member;

a support member that holds one end portions of the respective claw members such that the claw members are swingable;

an actuator configured to drive the claw members; and a plurality of sensors attached to the respective claw members, each of the sensors being configured to sense an amount of deformation of a corresponding one of the claw members to which the sensors are attached, when the claw members grip the gripping target member, wherein each of the claw members has a pair of faces facing opposite sides in a direction in which each of the claw members swings, each of the sensors is mounted on one of the faces, and is configured to sense an amount of longitudinal deformation of a corresponding one of the claw members, each of the claw members has a groove formed on the other of the faces and functioning as stress concentration point, the groove extending across an entire width of each of the claw members in a direction orthogonal to a longitudinal direction of each of the claw members, and the stress concentration point is located opposite a corresponding one of the sensors.

2. The robot hand according to claim 1, wherein each of the sensors is mounted on a face of the corresponding one of the claw members, the face facing outward in the direction in which each of the claw members swings.

3. The robot hand according to claim 1, wherein each of the sensors includes a piezoelectric sensor having a width narrower than a width of the claw members in a direction orthogonal to a longitudinal direction of the claw members.

4. The robot hand according to claim 2, wherein each of the sensors includes a piezoelectric sensor having a width narrower than a width of the claw members in a direction orthogonal to the longitudinal direction of the claw members.

* * * * *